UNITED STATES PATENT OFFICE.

JOHN H. STEVENS, OF NEWARK, NEW JERSEY, ASSIGNOR TO THE CELLULOID COMPANY, OF SAME PLACE.

COMPOUND OF PYROXYLIN.

SPECIFICATION forming part of Letters Patent No. 564,343, dated July 21, 1896.

Application filed August 16, 1895. Serial No. 559,527. (No specimens.)

*To all whom it may concern:*

Be it known that I, JOHN H. STEVENS, of the city of Newark, in the county of Essex and State of New Jersey, have invented certain new and useful Improvements in Pyroxylin Compounds, of which improvements the following is a specification.

This invention has for its object the formation of new compositions of matter by combining pyroxylin with acetxylid, which I have discovered possesses the power of dissolving soluble pyroxylin when melted by means of heat.

The state of the art to which this invention appertains and the properties of solid solvents of pyroxylin are fully described in my United States Patent No. 517,987 of April 10, 1894, to which I refer for such information as is not contained in the present specification.

In order to enable the skilled operator to practice my invention, I would state that while the acetxylid ($C_{10}H_{13}NO$) resembles camphor in being a solvent of pyroxylin when melted, the experience with camphor is no guide to the use of acetxylid, the action of acetxylid being widely different from that of camphor.

The acetxylid occurs in several modifications dependent on molecular structure. I find, practically, that the common form is largely a combination of the meta and ortho varieties, acetorthoxylid, ($CH_3.CH_3.NH.C_2H_3O.C_6H_3$,) acetmetaxylid, ($CH_3.C_6H_3.CH_3.N.H.C_2H_3O$.) They are produced simultaneously, together with traces of homologous and isomeric compounds, by boiling commercial xylidin with glacial acetic acid; also by heating commercial xlidin with acetal chlorid. The crude product is purified by repeated crystallization from boiling water. Other methods of preparation are known, but these mentioned above commend themselves to the operator by reason of their simplicity.

In using acetxylid as the only solid solvent I prefer to intimately combine it with the pyroxylin, either by grinding the two together in water and then expelling the water or by uniting the acetxylid with the pyroxylin by means of a mutual solvent, the best menstruum for this purpose being wood-spirit. After the latter combination is effected I allow the wood-spirit to evaporate from the compound. Either of these processes leaves the acetxylid in intimate combination with the pyroxylin; but the conversion into a perfectly solid strong compound is not yet effected. By subjecting the mixture, however, to heat and pressure in a die or suitable machinery, I obtain a hard, solid, homogeneous combination of the acetxylid and pyroxylin. As is well understood, coloring ingredients can be suitably combined so as to vary the character of the product.

Any attempt to get a perfect rolling mixture with acetxylid will be a failure unless the acetxylid is in extremely small proportions, say, about one-tenth to the weight of pyroxylin. Proportions equivalent to those which are perfectly practicable when camphor is used, say, one part of the solid solvent to two parts of the pyroxylin, result in a disintegrated mass, discouraging to the operator unless he bears in mind the instructions hereinbefore given to dry out the liquid solvent and subject such mass or the mixture of acetxylid and pyroxylin to heat and pressure sufficient to convert it into a homogeneous condition. In other words, while the camphor-pyroxylin mixtures leave the converting-rolls as a strong tenacious material, which only requires solidification to perfect it, the acetxylid-pyroxylin compounds (even when made with the aid of the most powerful liquid solvents, such as acetone and wood-alcohol, for instance) are weak and brittle masses. The exception is when about ten per cent. of the acetxylid is employed; but this result is only useful for compounds requiring very little plasticity under heat in the final product.

I find that the acetxylid is especially useful in combination with other solid solvents; for instance, with camphor and acetanilid, though even when combined with other solid solvents the acetxylid, to some extent, best exhibits its usefulness when the solid process of conversion is employed—that is, when, say, for instance, acetxylid, camphor, and pyroxylin are intimately combined and then converted into a solid mass after the combination is freed from water or other liquids.

By using an excess of such solvents as acetanilid or camphor in combination with acetxylid I have succeeded in producing compounds which, in their final seasoned condition, were more plastic or more easily manipulated when heated than camphor or acetanilid compounds in which the acetxylid was not present. In other words, the small proportion of acetxylid improves the camphor or acetanilid compounds. It also hardens the camphor combinations.

The usefulness of the acetxylid is not confined to rolling or solid mixtures, but is exhibited in the more fluid compounds in which the solid solvent is employed in combinations which are to be flowed. I recommend the acetxylid to be employed with an excess of such other solid solvent as is desired in such combination; for instance, camphor or acetanilid. For the more fluid combinations acetone is an excellent liquid menstruum.

Acetxylid is only sparingly soluble in alcohol or acetone. It is much more soluble in wood-spirit, as before mentioned; but when combined with acetanilid or camphor the solubility of the acetxylid is increased to a remarkable extent.

As to proportions, to each one hundred parts pyroxylin I would recommend for the dry process of conversion twenty-five to fifty parts acetxylid or of a mixture of equal parts acetxylid and either acetanilid or camphor or of the three combined in equal proportions. For a rolling mixture, which is to leave the rolls in a tenacious condition similar to the camphor materials, I would recommend ten parts acetxylid or the addition to this of forty parts of camphor. For a liquid combination for flowing I have used with good results ten parts acetxylid and a sufficient quantity of acetone alone or combined with other suitable solvents, like acetate of amyl, for instance. To obtain extra plasticity in the final dried product of the liquid solution, I find that it is best to add twenty to forty parts of camphor or twenty parts of acetanilid. Under these conditions acetxylid will be found to be a useful solvent of pyroxylin.

Having thus described the nature and object of my invention, what I claim, and desire to secure by Letters Patent, is—

1. The process for the manufacture of pyroxylin compounds which consists in intimately combining pyroxylin and acetxylid and afterward subjecting the mixture to heat and pressure sufficient to convert the mixture into a homogeneous product, substantially as described.

2. The process for the manufacture of pyroxylin compounds which consists in mixing acetxylid and other known solvents of pyroxylin, and afterward subjecting the mixture to heat and pressure sufficient to form it into a homogeneous solid, substantially as described.

3. The process for the manufacture of pyroxylin compounds which consists in mixing pyroxylin and acetxylid with other known solvents of pyroxylin sufficient in amount to convert the mixture into a solution of pyroxylin, substantially as described.

4. As a new composition of matter, a pyroxylin compound containing acetxylid, substantially as described.

5. As a new composition of matter, a pyroxylin compound containing acetxylid in combination with other known solvents of pyroxylin, substantially as described.

In witness whereof I have hereunto signed my name this 13th day of August, 1895.

JOHN H. STEVENS.

In presence of—
ABRAHAM MANNERS,
F. WM. RAWLE.